L. E. BARRINGER.
INSULATING COMPOUND.
APPLICATION FILED AUG. 7, 1907.
1,085,102.
Patented Jan. 27, 1914.
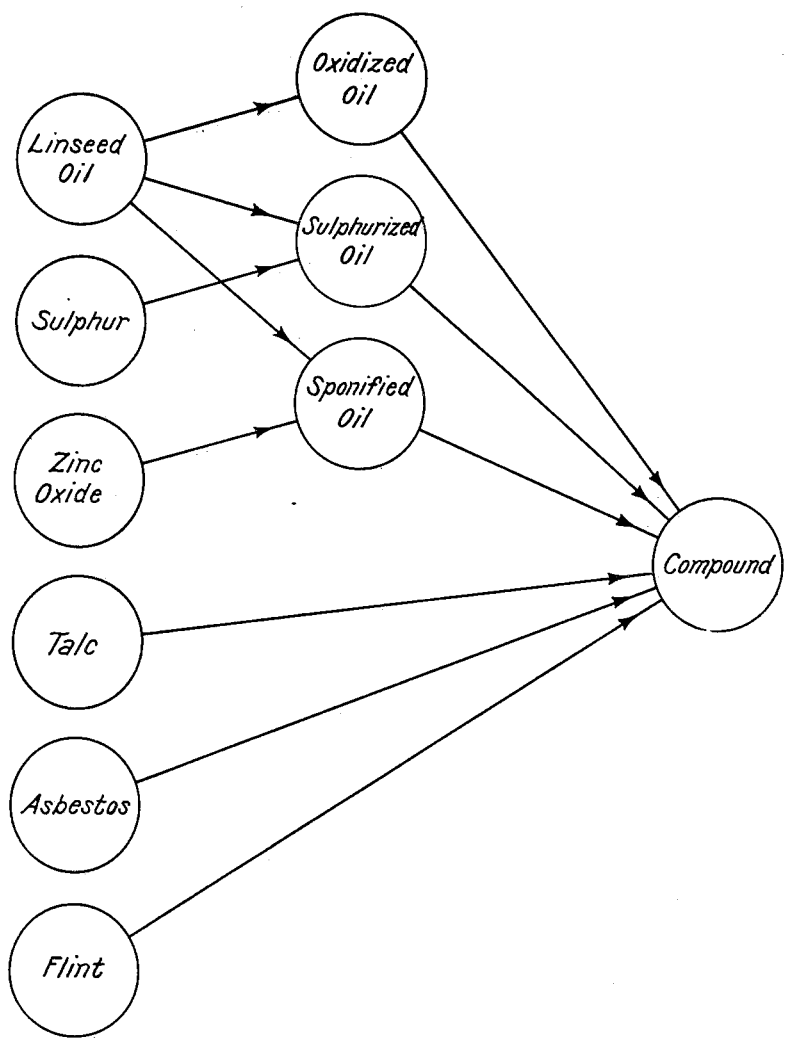
Witnesses:
Inventor:
Lawrence E. Barringer,
by
His Attorney.

UNITED STATES PATENT OFFICE.

LAWRENCE E. BARRINGER, OF SCHENECTADY, NEW YORK, ASSIGNOR TO GENERAL ELECTRIC COMPANY, A CORPORATION OF NEW YORK.

INSULATING COMPOUND.

1,085,102. Specification of Letters Patent. Patented Jan. 27, 1914.

Application filed August 7, 1907. Serial No. 387,548.

*To all whom it may concern:*

Be it known that I, LAWRENCE E. BARRINGER, a citizen of the United States, residing at Schenectady, county of Schenectady, State of New York, have invented certain new and useful Improvements in Insulating Compounds, of which the following is a specification.

This invention relates to electrical insulating materials and has for its object the provision of a compound, which in addition to having high insulating properties, is hard, dense and impervious to moisture.

In carrying out my invention I combine materials which, when properly treated, form a hard material, the pores of which are filled with an impervious compound.

The accompanying drawing illustrates diagrammatically the various steps in the process of forming my new composition.

I have found that what is known as "artificial rubber" or "sulfurized oil" is very desirable as a moisture-excluding filler, the reactions between the sulfur and oil being accompanied by a swelling or puffing-up of the mass, to form a spongy, rubber-like product. Now by causing this reaction to occur in the pores of a compound throughout its structure, the latter is rendered waterproof, or impervious. The compound must be sufficiently strong to withstand the swelling action of the sulfurized oil.

I have found that by the proper combination of materials, the compound may be formed and the waterproof effect accomplished in the same operation. This is done by using materials which will saponify the same oil used for producing the sulfurized oil, as calcium hydrate or zinc oxid or the like. If these materials alone are moistened with oil and heated to the neighborhood of 200° C. a solid mass is formed, quite strong and hard, but porous and easily disintegrated by water, although apparently insoluble. Now, if sulfur is added to the mixture, there being sufficient oil to react with both the sulfur and the lime or zinc oxid or other base, a hard, dense mass is formed—impervious and not attacked by water. Further, any mineral powder or inert material moistened with oil, such as linseed oil, and baked, becomes a solid, firm mass, quite strong and tough. This may be through the oxidization or other changes in the oil itself, caused by the heating, the oxidized oil acting as a binder for the mineral particles. With the use of proper ingredients, therefore, three different reactions may occur in the same mass, viz., the formation of sulfurized oil or artificial rubber, the formation of saponified oil, and the change to oxidized oil. The mass becomes sufficiently hard before the formation of the sulfurized oil (which occurs at a temperature of from 150° to 280° C.) to withstand the "pore-filling reaction", or the swelling due to the formation of the sulfurized oil.

In addition to the ingredients necessary for the reactions mentioned, an inert filling material may be used, as flint, ground slate, feldspar, or ground mica, or any mineral or rock powder which has good insulating qualities and is fairly refractory. Also a fibrous strengthening material, as asbestos, may be used to increase the strength and toughness, and also facilitate manufacture through making the materials hang together better when freshly molded. Further, a coloring matter, as manganese dioxid, may be added to change the brownish color, which the composition would ordinarily have, to black.

A composition I found quite satisfactory is as follows:

| | |
|---|---|
| Zinc oxid | 20 |
| Sulfur | 8 |
| Ground flint | 40 |
| Powdered talc | 12 |
| Short white asbestos | 20 |
| | 100 |

To these materials there is added, by weight, from 15 to 20 parts of boiled linseed oil and the whole is mixed in any suitable mixer until the mass is uniformly mixed throughout. The composition will then be found of a suitable consistency for pressing, which may be accomplished in steel molds in hydraulic presses, or may be molded by screw presses or in any other known manner. After molding to the desired shape the pieces are subjected to a temperature of 150 to 220° C. for from 4 to 8 hours, depending upon the size of the pieces, which treatment produces the reactions above described and forms a dense, hard, impervious product, of good insulating qualities and mechanical strength. The compound, when cut with a knife, somewhat resembles fiber in color and texture and also in that it may be machined without difficulty. But, unlike fiber, it is not inflammable and will withstand considerable heat and will not warp or get out of shape after once being formed and hardened.

The composition above given, of course, may be modified within a considerable range, both in the proportions of the ingredients and in the materials used to accomplish the same results. For instance, slaked lime may be used instead of the zinc oxid, or raw linseed oil may be used instead of the boiled linseed oil, or other oils may be used, as cotton seed oil or castor oil, but the linseed oil is preferable on account of its swelling or puffing up to a greater extent than the other oils mentioned. Or, the compound may be made either with or without asbestos or other fibrous material. Or slate or feldspar or similar material may be used, instead of the flint. The mass may be colored by manganese dioxid or by bone-black. If an organic coloring matter is used, as bone-black, less is required and it is also necessary to use less in order not to seriously injure the insulating properties of the compound. As high as 50 per cent. manganese dioxid may be used, replacing the flint or other inert matter, while almost the same color may be secured by using only 5 per cent. of bone-black.

While 200 to 220° has been found the most suitable temperature a fairly hard product may be obtained as low as 150° and a hard, strong product is still obtained on carrying the temperature as high at 280° C. But in the case of the lower temperatures the hardening seems due mostly to the baking of the oil alone and the resulting product is not as water-resistant and permanent. The reactions of saponification and vulcanization of the oil require for best development in the neighborhood of 200 to 220° C. This gives a product which may be soaked in water for weeks without any apparent deterioration. The temperatures above 220° do not give improvement in the qualities of the compound noticeable enough to warrant the use of the increased temperature. It will be further understood, of course, that the materials and proportions thereof above enumerated are given merely for purposes of illustration and hence may be varied without departing from the spirit of my invention, the scope of which is set forth in the annexed claims.

What I claim as new and desire to secure by Letters Patent of the United States, is,—

1. The process of forming a hard, dense insulating composition consisting of mixing oil and sulfur with a saponifying material and heating to a temperature which causes both saponification and sulfurization of the oil.

2. The process of forming a hard, machinable insulating composition consisting of mixing oil and sulfur with a saponifying material and heating to a temperature of about 150°–200° C. to cause saponification and sulfurization to take place successively.

3. The process of making a hard, impervious composition which consists in mixing a saponifying material, sulfur and oil, the latter ingredient being in sufficient amount to combine both with the saponifying material to make a hard, strong mass, and with the sulfur to fill the pores of said mass with sulfurized oil, molding the mixture and heating to a temperature at which the ingredients react.

4. The process of making a hard, machinable, dense composition which consists in mixing zinc oxid, sulfur and a substantial proportion of oil to combine with both the zinc oxid to make a hard, strong mass, and the sulfur to fill the pores of said mass with sulfurized oil, molding the mixture and heating the same to the reaction temperature.

5. The process of making a hard, machinable composition impervious to moisture which consists in mixing substantially 20 parts of zinc oxid with sulfur and 15 to 20 parts of linseed oil, molding the mixture and heating to a temperature at which the oil and oxid react to form a hard porous mass and the sulfur will combine with some of the oil to fill the pores of said mass.

6. A hard dense insulating composition comprising sulfurized oil and saponified oil.

7. A dense, machinable insulating compound comprising a hardened mixture of linseed oil and a refractory material having its pores filled with sulfurized oil.

8. A hard dense insulating material which is impervious to moisture comprising a hard compound of an oil and a saponifying material and sulfurized oil filling the pores of said material.

9. A composition of matter comprising a strong, hard material of insulating properties and sulfurized oil filling the pores of said material.

10. A composition of matter comprising a strong, hard material consisting of inert material, saponified oil, oxidized oil, and sulfurized oil filling the pores of said material.

In witness whereof, I have hereunto set my hand this 3rd day of August, 1907.

LAWRENCE E. BARRINGER.

Witnesses:
BENJAMIN B. HULL,
HELEN ORFORD.